Feb. 20, 1934. E. S. HALSEY Re. 19,090

ABSORBER REFRIGERATING APPARATUS

Original Filed Nov. 13, 1925 2 Sheets-Sheet 1

INVENTOR.

Edward S. Halsey

Feb. 20, 1934. E. S. HALSEY Re. 19,090

ABSORBER REFRIGERATING APPARATUS

Original Filed Nov. 13, 1925 2 Sheets-Sheet 2

INVENTOR.

Edward S. Halsey

Reissued Feb. 20, 1934 Re. 19,090

UNITED STATES PATENT OFFICE 19,090

ABSORBER REFRIGERATING APPARATUS

Edward S. Halsey, North Miami, Fla.

Original No. 1,779,211, dated October 21, 1930, Serial No. 68,895, November 13, 1925. Renewed March 20, 1930. Application for reissue October 14, 1932. Serial No. 639,377

16 Claims. (Cl. 62—119.5)

The nature of my invention is in the form of improvements of that class of absorber refrigeration disclosed by U. S. Patent No. 662,690, issued to Geppert, the characteristic feature of which is an intermediate gaseous absorber medium employed as a carrier agent between the evaporating refrigerant surface and the liquid absorbing surface.

The simple embodiment of which herein disclosed consists of a continuously operating single cellular evaporator-absorber chamber constituted principally by a pair of parallel vertical opposed heat-transmitting walls thermally insulated from each other; down one of which walls trickles the evaporating refrigerant, while the liquid absorbent trickles down the other opposite wall of said chamber.

The vapor is conveyed from the refrigerating side of said cell to the absorber heat-rejecting side by rapid vertical convection currents of an inert gas confined within said chamber. The rich liquor drains off by gravity to a vertical tubular boiler fixed to one side of said unit, said boiler operating continuously in such a manner as to drive off and deliver a constant flow of liquid refrigerant to the top of said refrigerating wall and a continuous flow of cool absorbing liquor to the top of said adsorber heat-rejecting wall.

The objects of my invention are to provide a more simple, reliable, compact and efficient device free from obnoxious or dangerous refrigerants or pressures, and one not requiring expert service attention; one that can be more easily and conveniently applied to common household refrigerators, ice cream cabinets, water coolers and the like, said objects being attained by improvements in the general construction and system of operation and arrangement of parts of the absorber units, the heat-rejecting units, the boiler and circulation elements and heat-rejecting elements. Also by the employment of effective radiant heat shields and heat-insulating sections of the chamber walls, and new absorber and refrigerant combinations.

Further objective features will be made apparent by the following specification.

Referring to the drawings which illustrate my invention similar reference characters refer to similar parts throughout the several views in which:

Fig. 4 is a fractional side view of a modification adapted to installation on the top of a refrigerator, while Fig. 5 shows by diagrammatic sketch a cross section through a flat modification of my evaporator-absorber in contrast to the annular cell construction of the two other modifications above referred to.

Figure 1:
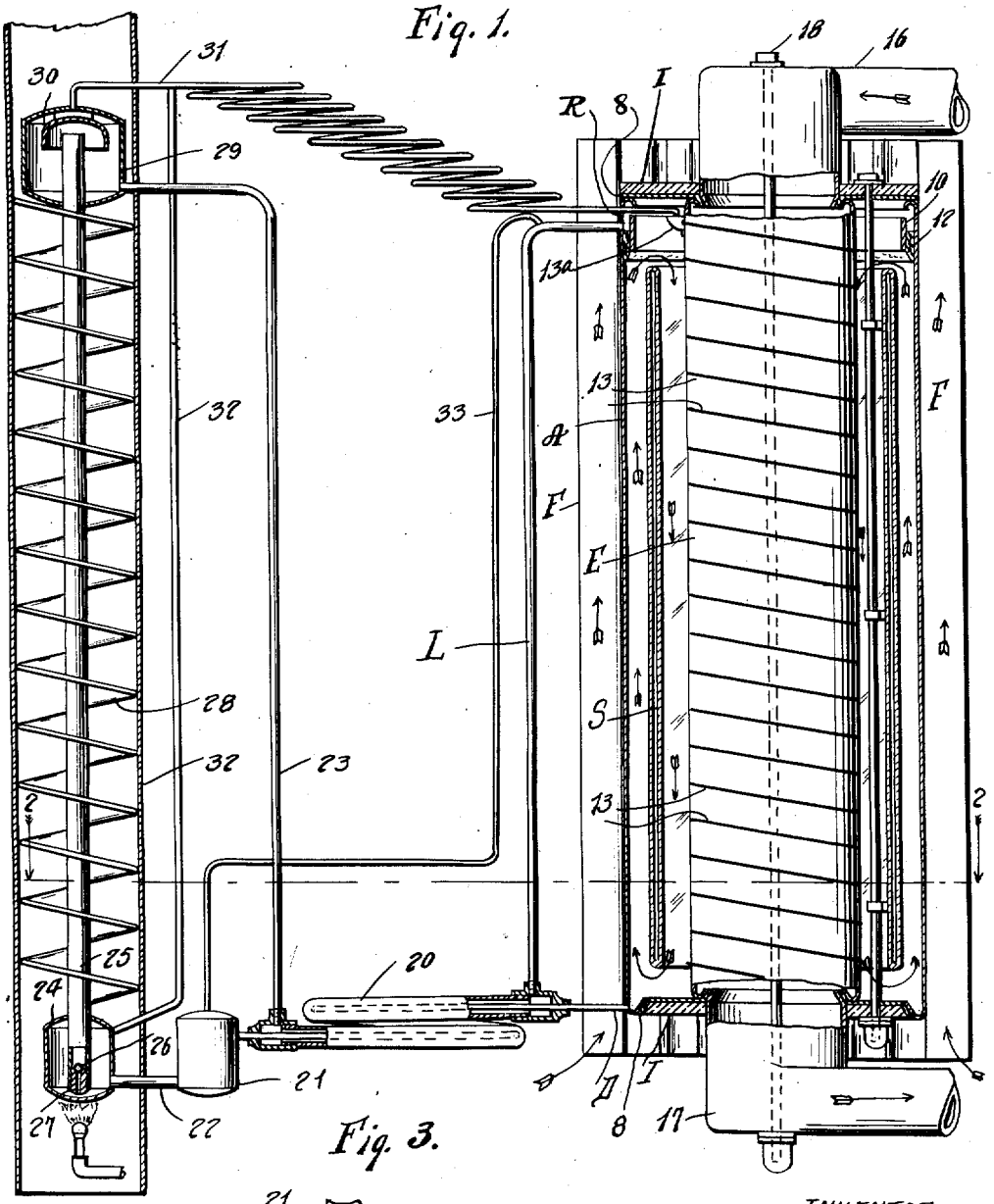
Fig. 1 is a side elevation of my preferred form in partial cross section.
Figure 3:
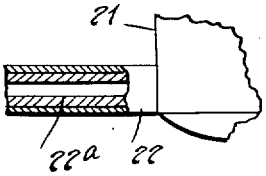
Fig. 3 is an enlarged section of the insulating boiler feed nipple 22.
Figure 2:
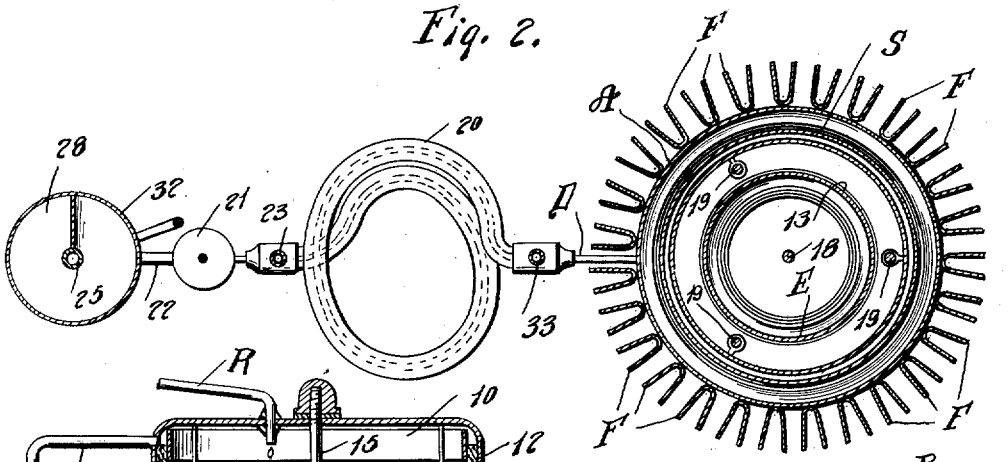
Fig. 2 is a plan cross section thereof on line 2—2 of Fig. 1.

Referring to the details of construction beginning with Fig. 1, A indicates the outer cylinder of the evaporator-absorber equipped with air cooling fins F for certain and continuous heat rejection. E indicates the inner wall of the annular chamber which acts as the evaporating refrigerating surface. I indicates an insulating ring one of which seals either end of the annular chamber, compressing a plastic gasket 8 against the cylinder's ends. S indicates a cylindrical heat shield intermediate between the inner and outer walls of the chamber. 16 and 17 are upper and bottom brine-circulating fittings leading from a brine tank not shown. 31 is a constant air cooled condenser coil leading from the top of the boiler to the top of the inner refrigerating wall, depositing the condensed refrigerant onto a distributing cord 13 wound spirally around this cylinder. 23 is a weak liquor duct leading from the top of separating chamber 29 at the top of the boiler leading through the outer shell of the heat-transfer coil 20 and up through the weak liquor supply tube L into an annular distributing trough within the upper end of the outer wall formed by an expansion collar 10 which retains a felt collar 12 forming a porous bottom for this trough. This provides means for keeping the entire inner surface of the heat-dissipating wall wetted with the absorbent liquid by a trickling flow from top to bottom. D indicates a drainage duct from the bottom of the cylinder which extends through the heat transfer coil 20 to cushion chamber 21. 22 is a heat-insulating nipple leading from 21 to the lower part of cushioned chamber 24. This nipple is formed of Monel metal or the like and has a heat-insulating lining 22[a]. 25 is a vertical tube forming the main body of the boiler in the bottom end of which is a small port 27 draining the bottom of chamber 24 and equipped with a check valve 26. This vertical boiler has brazed to it a continuous copper fin or worm 28 for absorbing heat from the flue gases passing up through the stack 32. Supported above the top end of the boiler tube is a bell deflector 30. R is the terminal of tube 31 for discharging the condensed refrigerant. 37 is a pressure equalizing tube leading from chamber 24 up to the condenser coil 31. 33 is another equalizing tube leading from the cushion chamber 21 to the upper side of the weak liquor pipe L to equalize the pressure between the two chambers connected thereby. 13[a] is a catch pocket for the refrigerant leading it from the condenser to the distributing cord 13.

It should be understood that with this type of absorption refrigeration devices the pressure is practically uniform throughout the whole system with the exception of the static head of the boiler liquid column which would have a pressure differential of less than one pound, and, as disclosed by this Geppert patent, many volatile liquids commonly used for refrigeration may be employed with suitable absorbents.

As has already been pointed out, this class of devices require an intermediate absorber gas as a vapor-transfer medium between the refrigerant vaporizing surface and the absorber liquid surface, and, while it is convenient to use common air, I prefer to use some inert non-explosive gas, such as nitrogen or helium, preferably the latter on account of its very light gravity which materially enhances the velocity of circulation of this vehicle gas with which the evaporator-absorber chamber is charged. As this gas absorbs vapor from the evaporating cylinder, it simultaneously becomes heavily laden with the vapors and at the same time greatly chilled, so that the gas column lying between the heat shield S and the evaporating wall is very much heavier than the column lying between the heat shield and the absorbing cylinder or wall which has partly or completely given up its vapor burden to the absorber film trickling down the inner wall of the outer cylinder, thereby stimulating the rapid convection currents around the heat shield, this enhanced velocity materially facilitating the rapidity of absorption and evaporation.

To facilitate the uniform wetting of the entire inner surface of the outer wall or cylinder by the absorber, I prefer to prepare the inner surface by chemical action so as to leave a porous, rusty surface.

The heat-dissipating fins F are preferably secured to the shell first by spot or roller welding to the cylinder, after which the thermal conductivity is increased by running the assembled unit through a tinning bath.

I preferably construct the cylindrical heat shield S of two glass mirrored walls with an intervening vacuum equivalent to the construction of the conventional thermos bottle, but this shield may be made of any conventional heat insulator, such as cork. I prefer to operate this unit at or near atmospheric pressure, dependent upon the condensing temperature and pressure of the refrigerant employed. With the refrigerant above specified it is desirable to maintain a partial vacuum throughout the system.

To follow out the cycle of operation, when sufficient rich liquor has accumulated in chamber 21 to flow into chamber 24, upon its striking the hot spot over the gas flame shown, a miniature concussion occurs, arresting the flow of liquid into chamber 24 and expelling the portion already pocketed in the bottom of chamber 24 past check valve 26 into the boiler tube. As soon as this excess pressure has been relieved by the escape of vapor from the boiler chamber through pipe 37 to the condenser, this intermittent propulsion of the liquid is repeated, thus constantly raising the ebulating liquor up through the boiler column until it is discharged into the separating chamber 30 at the top. The liberated refrigerant vapor passes to the condenser partly from chamber 30 and partly from chamber 24. The weak liquor separated in the top chamber descends through pipe 23 and through the heat-transfer worm 20, rising through pipe L, discharges into the annular trough at the top of the absorber wall, from which it distributes and trickles down, again absorbing refrigerant vapor from the carrier gas by which it is fully charged, becoming rich liquor by the time it reaches the drain trough at the bottom.

The inertia of the long liquid column in the drainage duct D extending around through the coil 20 is sufficient to prevent an appreciable backward movement of the drainage flow at the period of concussion, when fresh liquor is ejected into chamber 24, but I may use a sensitive check valve in this drainage tract at a suitable point before it discharges into chamber 24 in such cases as it may be desirable to use a more direct flow of liquor from the absorber to the cushion chamber.

Figure 4:
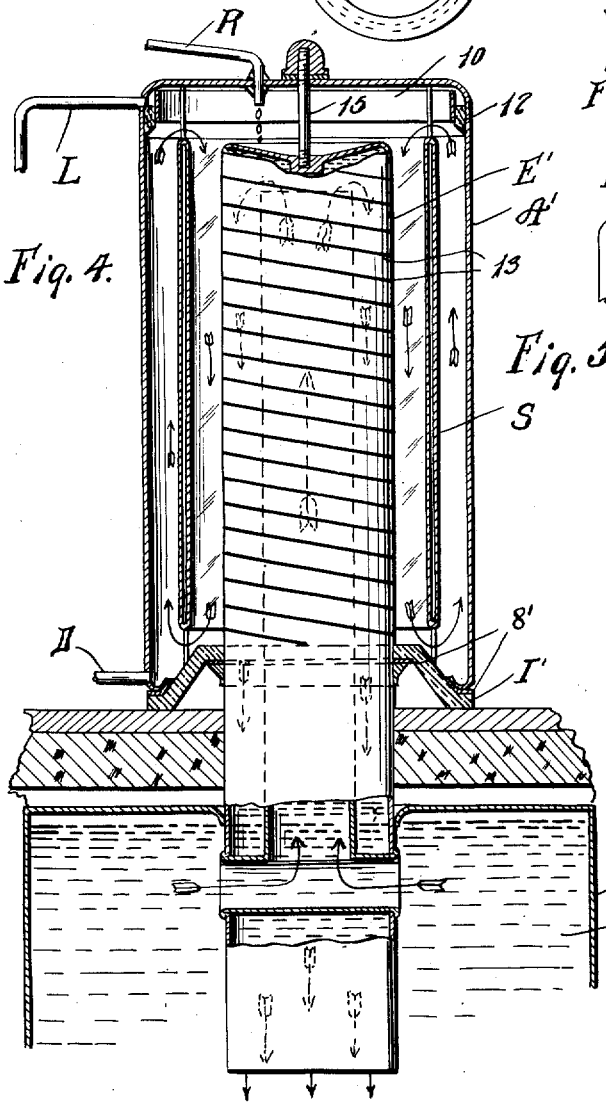

Referring to the modification shown by Fig. 4 this operates exactly in the same manner as the form shown in Fig. 1, with the exception that the brine circulation is not led in at the top of the cooling sleeve E as in Fig. 1, but, in order to adopt this for installation on top of an ordinary ice box with a brine tank T below the top of the box, both inner and outer cylinders of the unit are headed over or made of closed shells, the inner shell or cylinder being supported from the head of the outer cylinder by a non-metallic bolt 15 having a plastic gasket under its blind nut, thus sealing it against the atmosphere. The tension of this bolt or stud makes a compression tension on the two plastic gasket rings which seal the joints between the shoulders of the two cylinders at the lower end and the molded insulating collar I'. In this modification the refrigerating cylinder wall is extended down through a hole in the top of the refrigerator and through a hole in the top of the brine tank for some distance, and in order to create a definite circulation through this cylinder and brine tank, a smaller brine draft tube is fitted within the refrigerating cylinder and secured by a T head or crossed duct sweated into opposite openings through the refrigerating cylinder below the brine level, so that as the brine in contact with the refrigerating cylinder in the upper portion increases in density it descends around the inner draft tube, drawing up warm brine from the upper part of the brine tank, as indicated by arrows, maintaining an efficient circulation throughout the refrigerating cylinder and brine tank.

Figure 5:
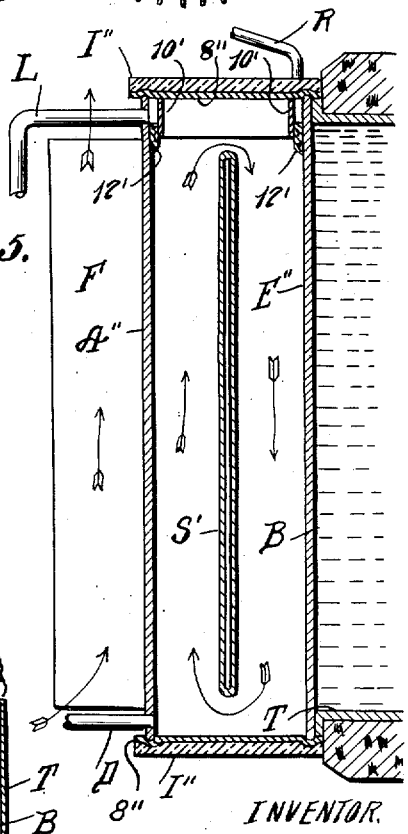

The flat modification of my evaporator-absorber shown by Fig. 5, is introduced to show how my invention may be applied to the flat side of a brine or water tank or refrigerator space that it is desired to cool.

When applied to the latter purpose it is obvious that the flat refrigerating cell may constitute one entire side wall of the refrigerator casing it is adapted to cool, as shown by the drawings, or it may constitute only a portion thereof, preferably the upper portion, adapted to stimulate rapid downward convection currents of the cooled air or other media within said casing so as to permeate the entire refrigerated space throughout the casing with a vigorous circulation of the refrigerated fluid.

In this modification the heat shield S', as well as both the evaporating refrigerating wall E'' and absorber heat-rejecting wall A'', would be flat plates, and the liquid-distributing troughs at their upper edges would extend from one end of the evaporator-absorber chamber to the other. The heat shield in this flat construction, of course, would have to be constructed without an internal vacuum.

As is indicated by the drawings, both of the pressure equalizing tubes shown leading from the tops of chambers 21 and 24, respectively, are of very small bore, so proportioned as to institute the proper time interval or lag for the relief of the sudden intermittent pressures developed in said chambers. Said time intervals may be adjusted and regulated by further restricting the passages of said tubes by pinching or other means.

I wish to emphasize the several important advantages secured over that of my predecessor's disclosure (above referred to) by my construction of the evaporator-absorber chamber having both the evaporator and absorber heat-conducting surfaces arranged in vertical banks opposite each other with their entire outer vertical surfaces directly contacting, respectively, with convection currents of the cooled and cooling fluids, so that a most effective circulation of both of said fluids is automatically maintained.

Further, by the introduction of an intervening heat shield between them which not only prevents direct radiant and conduction losses between opposite sides of the shield, but also prevents promiscuous intermediate convection losses. Furthermore, the interposed partition establishes definite and much accelerated down and up circulation of the gas on the cold and warm sides of the partition, at the same time crowding its draft directly against the wetted refrigerating and absorbing surfaces arranged on opposite sides thereof.

The process of absorption is materially enhanced by the trickling movement of the absorbent distributed over the entire vertical absorber surface. The viscosity of the absorbent as delivered by the distributing trough is quite dense. As it moves downward it constantly exposes fresh molecules to the refrigerant vapor, which upon being absorbed thins down the absorbent's viscosity at the surface film so as to flow downwards more and more rapidly as it progressively thins it, thus constantly exposing a more dense and avid under layer of the absorbent film to the action of the vapor.

The process of evaporation is also enhanced by its constant trickling movement down its vertical walls.

As previously pointed out, I have only attempted herein to show my invention in its simplest forms and I do not wish to be limited simply to the forms shown, as numerous modifications will immediately be obvious to all skilled in the art. For instance, while I have simply shown a capillary wick band as an outlet for the distributing trough, it is obvious that any distributed series of capillary outlets could be used. Likewise, while I have only shown the simplest forms of the vertical absorber and refrigerating walls, consisting of a single tubular wall each, it is obvious that for larger capacities these surfaces should be increased by the addition of an encircling series of vertical tubes piercing the chamber from top to bottom or by vertical corrugations of the simple walls shown.

I claim:

1. In a device of the class described, an enclosed evaporator-absorber chamber unit constituted essentially of a vertically disposed evaporator refrigerating wall, a vertically disposed heat rejecting wall arranged opposite to and parallel with the first said wall, heat insulating means for enclosing and sealing the juncture in the walls of said chamber intervening between said walls extremities consisting of heat insulating material, means for constantly wetting the top of one of said walls by liquid refrigerant, and means for constantly circulating a liquid absorbent through said chamber.

2. In a device of the class described, an enclosed evaporator-absorber unit cell constituted primarily by an opposed pair of vertically disposed heat-conducting walls, non-metallic insulating means for enclosing and sealing the juncture of said cell between said walls, a vertical heat shield fixed intermediately between said walls, a free gas passage above and below said shield, means for constantly wetting the top of one of said walls with refrigerant, and means for constantly wetting the opposite wall with an absorbent, and means for draining away the rich liquor from the bottom of said cell.

3. In a device of the class described, a closed annular evaporating absorber unit cell constituted by a pair of vertical cylindrical walls, one within the other, heat insulating means for spacing and closing the end juncture of said cylinders and sealing said chamber consisting of heat insulating material, means for constantly wetting the top of the inner cylinder inside said cell with refrigerant and means for circulating a liquid absorbent through said cell.

4. In operating connection with a vertical evaporator-absorber device of the class described, a liquid-elevating pumping boiler unit comprising a vertical tubular body the ends of which extend appreciably higher and lower than the liquid tract through said absorber, a port through the bottom end of said tube, a check valve in said port, an enveloping liquid pocket close beneath said port, a liquid duct adapted to intermittently squirt the drainage from said absorber into said pocket, a gas expansion chamber in said duct close to said pocket adapted to enhance said intermittent action, a separating chamber at the top of said tubular boiler for directing the refrigerant and weak liquor separately back to the respective tops of the evaporator and absorber, and suitable means for heating the boiler from the bottom upwards.

5. In a device of the class described, an evaporator-absorber chamber formed primarily by an expansive vertical parallel pair of heat conducting walls, heat insulating means for closing the juncture between said primary walls and sealing said chamber consisting of heat insulating material, a distributing trough extending substantially throughout the width of one of said walls, having a porous bottom of capillary material, and suitable means for constantly wetting said opposite opposing wall.

6. In operating connection with an evaporator-absorber device of the class described, an automatic circulating, elevating distilling tract for the rich liquor comprising a vertically inclined boiler tube, a horizontally inclined rich liquor drainage duct leading from said absorber to a bottom junction of said boiler tube, suitable means of heating the latter, and a sensitive check valve in said tract adapted to sustain the static head of said liquor in said boiler tube, and intermittently pass slugs of fresh liquor into the boiler at each spasm of ebullition in said junction.

7. In a refrigerating device for cooling a brine tank within a box by refrigerating means above the box; a vertical brine tube E' with a sealed top and open bottom end piercing the top of said box and extended into a brine tank within the box, a concentric updraft brine-flue within said tube with its upper open end spaced from the head of said tube and its bottom end terminating in a lateral duct opening through the side of said tube a short distance below the brine level in said tank, and means external to the upper end of said tube for refrigerating the brine therein and causing a free circulation of said brine throughout said tube and brine tank.

8. In a device of the class described, an evaporator-absorber chamber formed primarily by a substantially parallel opposed pair of heat conducting walls, one of said walls constituting an evaporator refrigerating element, and the other wall a heat rejecting absorber element; heat insulating means bridging and closing the marginal juncture between said primary walls and sealing said chamber, consisting of heat insulating material; means for constantly wetting the interior surface of said evaporator wall with refrigerant; means for circulating an absorbent liquid for said refrigerant over the interior surface of the other said wall; means for re-distilling said refrigerant from said circulated liquid and returning it to said evaporator surface, and a relatively narrow intermediary gas space between said walls.

9. A structure according to claim 8, having a suitable intermediate heat shield fixed between said evaporator and absorber walls.

10. In a device of the class described, an evaporator-absorber unit chamber formed primarily by an opposedly arranged pair of heat conducting walls, one of said walls constituting the evaporator refrigerating element, and the other wall a heat rejecting absorber element; heat insulating means bridging and closing the marginal juncture between said primary walls and sealing said chamber, consisting of heat insulating material; means for constantly wetting the interior surface of said evaporator wall with refrigerant; means for circulating an absorbent liquid for said refrigerant over the interior surface of the other wall; means for re-distilling said refrigerant from said circulated liquid and returning it to said evaporator surface, and an intermediary gas space between said walls.

11. A structure according to claim 10, having a suitable heat shield fixed intermediately between said evaporator and absorber walls.

12. A structure according to claim 10, having an external series of air cooling fins distributed on the outer surface of the heat conducting absorber wall of the chamber and being thermally fixed thereto, so as to materially enhance the rejection of heat to the surrounding air.

13. A structure according to claim 10, having an external series of vertically disposed air cooling fins thermally fixed to the outer surface of the absorber wall, so disposed as to facilitate the circulation of cooling air currents.

14. A refrigerator cabinet structure having a vessel mounted in the wall thereof, the surface of the vessel on the inside of the wall functioning as the evaporator of a refrigerating system and the surface of the vessel on the outside of the wall functioning as an air-cooled absorber of the refrigerating system.

15. The combination of an absorber refrigerating system and refrigerator cabinet cooled by said system wherein part of the structure of said cabinet is made of a dual walled vessel, the innermost wall of said vessel being exposed to the inside of the cabinet and functioning as an evaporator and cooler, with the opposite wall of said vessel being disposed on the outside of said cabinet and functioning as an air-cooled absorber.

16. In conjunction with an artificially cooled refrigerator space, in combination a vertical cooling wall section of said space wetted on its reverse side from said space by a suitable refrigerant, a heat rejecting refrigerant absorber wall positioned outside of the first said wall, substantially parallel therewith; means for automatically performing said wetting of the cooling wall; means for automatically wetting the inner side of said heat rejecting wall with a suitable absorbing liquid for said refrigerant; means for re-distilling said refrigerant from said absorbing liquid for re-issue to said cooling wall; a suitable intervening heat shield between the said two walls; and means for maintaining a charge of vehicle gas between said two walls.

EDWARD S. HALSEY.